JOHN BEACH.
Improvement in Harvesters.

No. 124,781. Patented March 19, 1872.

WITNESSES:
Jessie E. Lewis
John R. Hawkins

INVENTOR:
John Beach
per F. A. Morley
Atty.

UNITED STATES PATENT OFFICE.

JOHN BEACH, OF DE RUYTER, NEW YORK.

IMPROVEMENT IN HARVESTERS.

Specification forming part of Letters Patent No. 124,781, dated March 19, 1872.

Specification describing certain Improvement in Harvesters, invented by JOHN BEACH, of De Ruyter, in the county of Madison and State of New York.

The invention relates to an improved construction and arrangements of the parts of a harvester, whereby greater simplicity and cheapness are obtained, as hereinafter more fully explained.

Figure 1:
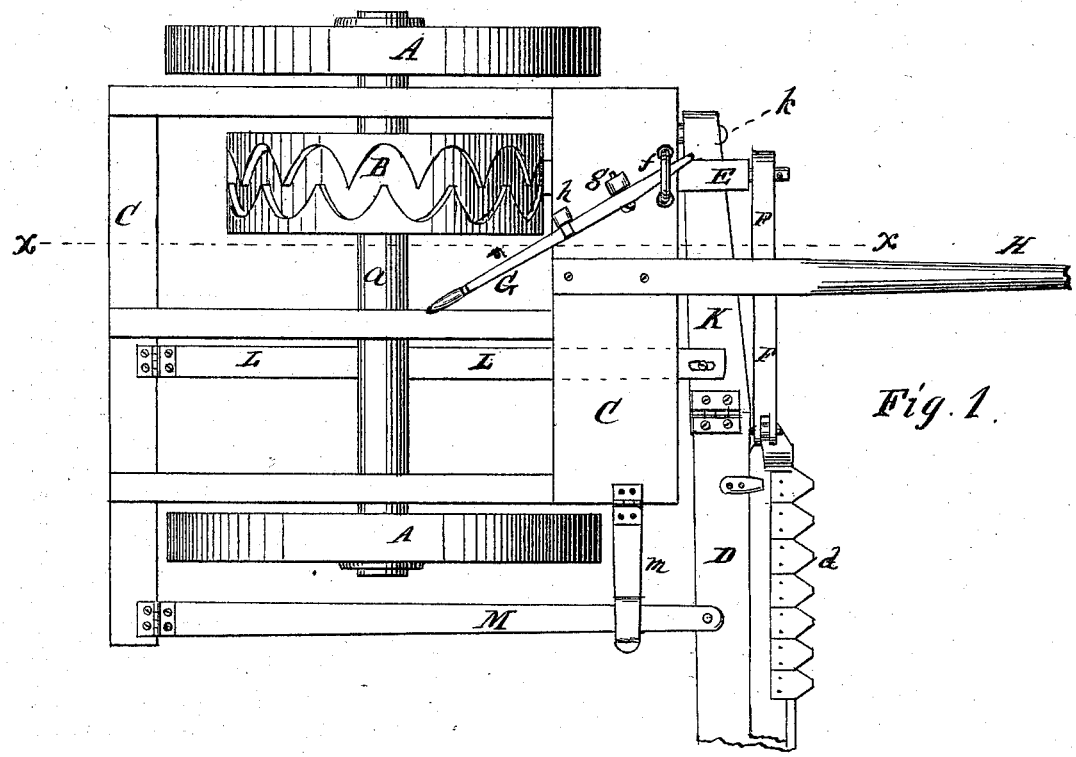
Figure 2:
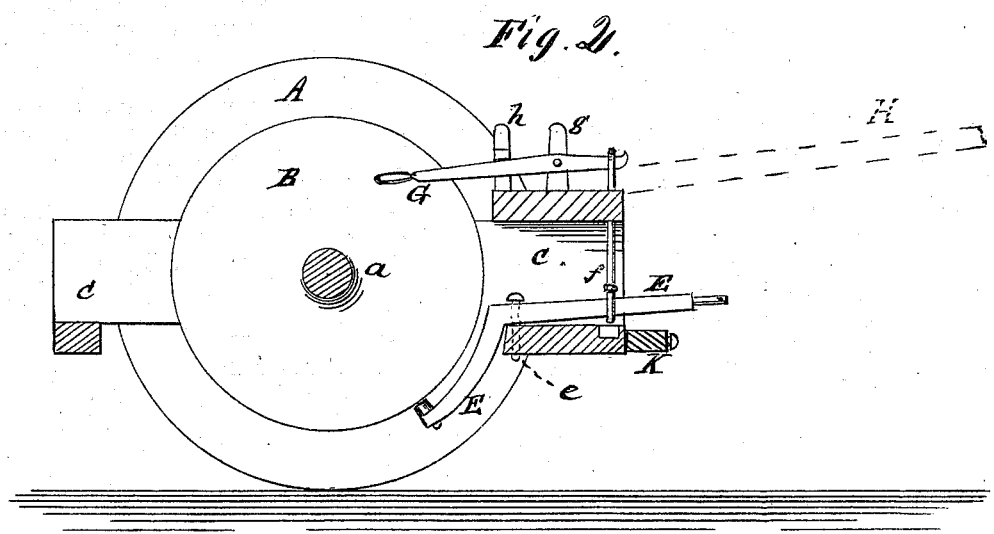

Figure 1 is a top view or plan. Fig. 2 is a vertical longitudinal section taken in the line $x\ x$ in Fig. 1.

A A are the ground-wheels that drive the axle $a$, on which is secured a driving-wheel, B, that has a reciprocating cam-groove in its periphery. C C is the frame of the machine, and D $d$ are the finger-bar and sickle. A crooked lever, E, is pivoted to the frame-work by a pivot, $e$, Fig. 2, its rear end connecting at will with the driving-wheel B, and its front end making connection with the sickle $d$ by the rod or pitman F. The lever E has a projection on its rear end that is formed by a pin and anti-friction roller, and by tilting the lever E slightly this projection is thrown into the groove in the driving-wheel, and the lever E is made to swing horizontally to drive the sickle by the said projection following the cam-groove in the driving-wheel. The devices for driving the sickle are thrown in and out of gear by a lever, G, that raises or lowers the front end of the lever E, by means of a stirrup, $f$. The said lever is pivoted to the standard $g$, and held in the raised or lowered position by a rack-standard, $h$. The finger-bar is placed partially in front of the machine to balance the draft on the tongue H. The greatest weight of the machine is on the driving-wheel side, which partially balances the cutting side, and by bringing the finger-bar partly in front of the machine the draft is nearly or quite balanced. The finger-bar is pivoted to the front of the frame by a link and pivot, K $k$, Fig. 1, and hinged braces L and M give this link and the finger-bar rear support. The brace M supports the finger-bar at or near its center, and is detachable therefrom to allow the finger-bar to be turned over backward onto the machine. When the brace M is detached from the finger-bar its front end is supported, to hold it clear of the ground, by a swinging arm, $m$, Fig. 1.

By these means I obtain a very simple construction and a proportionate reduction of cost.

Having thus described my invention, what I claim, and desire to secure by Letters Patent, is—

The combination of the finger-bar D and the hinged connection and lateral brace K, pivoted at $k$ to the frame of the harvester, with the braces L and M, the former having connection with the part K, and the latter arranged, as shown, to support the finger-bar at or near its center, and adapted to be disconnected therefrom and supported in an elevated position, substantially as described.

The above specification of my invention signed by me this 20th day of October, 1871.

JOHN BEACH.

Witnesses:
JESSIE E. LEWIS,
JOHN R. HAWKINS.